US011345167B2

(12) United States Patent
Shinkai

(10) Patent No.: US 11,345,167 B2
(45) Date of Patent: May 31, 2022

(54) INFORMATION PROCESSING APPARATUS, LEARNING APPARATUS, AND STORAGE MEDIUM STORING LEARNT MODEL

(71) Applicant: SEIKO EPSON CORPORATION, Tokyo (JP)

(72) Inventor: Masanari Shinkai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 265 days.

(21) Appl. No.: 16/856,295

(22) Filed: Apr. 23, 2020

(65) Prior Publication Data

US 2020/0338907 A1 Oct. 29, 2020

(30) Foreign Application Priority Data

Apr. 25, 2019 (JP) .............................. JP2019-083790

(51) Int. Cl.
  *B41J 11/00* (2006.01)
  *B41J 2/21* (2006.01)
  *G06N 20/00* (2019.01)

(52) U.S. Cl.
  CPC ........... *B41J 11/008* (2013.01); *B41J 2/2135* (2013.01); *B41J 11/005* (2013.01); *G06N 20/00* (2019.01)

(58) Field of Classification Search
  CPC ...... B41J 11/008; B41J 2/2135; B41J 11/005; B41J 19/145; G06N 20/00; G06N 3/0454; G06N 3/084

USPC ........................................................ 347/104
See application file for complete search history.

(56) References Cited

U.S. PATENT DOCUMENTS

| 10,730,293 B1* | 8/2020 | Lin ........................ B41J 2/015 |
| 2003/0016259 A1* | 1/2003 | Otokita .................. B41J 11/009 347/14 |
| 2018/0207968 A1* | 7/2018 | Arai ................... H04N 1/00045 |
| 2020/0230974 A1* | 7/2020 | Arai ....................... B41J 2/2135 |

FOREIGN PATENT DOCUMENTS

| JP | 2010-52438 A | 3/2010 |
| JP | 2015-174256 | 10/2015 |

* cited by examiner

*Primary Examiner* — Kristal Feggins
*Assistant Examiner* — Alexander D Shenderov
(74) *Attorney, Agent, or Firm* — Workman Nydegger

(57) ABSTRACT

An information processing apparatus includes a storage section configured to store a learnt model obtained by machine learning on a condition for an adjustment interval in accordance with a use state of a print apparatus, based on a data set in which use state information of the print apparatus and adjustment interval information indicating an interval of performing an adjustment process for a print position on a print medium are associated with each other, a reception section configured to receive the use state information of the print apparatus, and a processor configured to perform a process of estimating the adjustment interval, based on the use state information received and the learnt model.

8 Claims, 14 Drawing Sheets

FIG. 9

OBSERVATIONAL DATA

| | USE STATE INFORMATION | | | ELAPSED TIME (MONTH) | NORMAL/ ABNORMAL |
|---|---|---|---|---|---|
| | TEMPERATURE INFORMATION (°C) | PRINT FREQUENCY INFORMATION (PER DAY) | AGING INFORMATION (MONTH) | | |
| D1 → | $T_1$ | $N_1$ | $M_1$ | 1 | NORMAL |
| | $T_2$ | $N_2$ | $M_2$ | 2 | NORMAL |
| | ⋮ | ⋮ | ⋮ | ⋮ | ⋮ |
| | $T_9$ | $N_9$ | $M_9$ | 9 | NORMAL |
| | $T_{10}$ | $N_{10}$ | $M_{10}$ | 10 | NORMAL |
| | $T_{11}$ | $N_{11}$ | $M_{11}$ | 11 | NORMAL |
| D2 → | $T_{12}$ | $N_{12}$ | $M_{12}$ | 12 | NORMAL |
| D3 → | $T_{13}$ | $N_{13}$ | $M_{13}$ | 13 | ABNORMAL |

TRAINING DATA

| USE STATE INFORMATION | | | ADJUSTMENT INTERVAL INFORMATION (MONTH) |
|---|---|---|---|
| TEMPERATURE INFORMATION (°C) | PRINT FREQUENCY INFORMATION (PER DAY) | AGING INFORMATION (MONTH) | |
| $T_{10}$ | $N_{10}$ | $M_{10}$ | 10 |
| $T_{11}$ | $N_{11}$ | $M_{11}$ | 11 |
| $T_{12}$ | $N_{12}$ | $M_{12}$ | 12 |

FIG. 11

OBSERVATIONAL DATA

| USE STATE INFORMATION | | | ELAPSED TIME (MONTH) | NORMAL/ ABNORMAL |
|---|---|---|---|---|
| TEMPERATURE INFORMATION (°C) | PRINT FREQUENCY INFORMATION (PER DAY) | AGING INFORMATION (MONTH) | | |
| $T_1$ | $N_1$ | $M_1$ | 1 | NORMAL |
| $T_2$ | $N_2$ | $M_2$ | 2 | NORMAL |
| ⋮ | ⋮ | ⋮ | ⋮ | ⋮ |
| $T_9$ | $N_9$ | $M_9$ | 9 | NORMAL |
| $T_{10}$ | $N_{10}$ | $M_{10}$ | 10 | NORMAL |
| $T_{11}$ | $N_{11}$ | $M_{11}$ | 11 | NORMAL |
| $T_{12}$ | $N_{12}$ | $M_{12}$ | 12 | NORMAL |
| $T_{13}$ | $N_{13}$ | $M_{13}$ | 13 | ABNORMAL |

E1: rows 1–9
E2: rows 10–12
E3: row 13

TRAINING DATA

| USE STATE INFORMATION | | | ADJUSTMENT INTERVAL INFORMATION (MONTH) | DETERMINATION RESULT INFORMATION |
|---|---|---|---|---|
| TEMPERATURE INFORMATION (°C) | PRINT FREQUENCY INFORMATION (PER DAY) | AGING INFORMATION (MONTH) | | |
| $T_1$ | $N_1$ | $M_1$ | 1 | EARLY |
| $T_2$ | $N_2$ | $M_2$ | 2 | EARLY |
| ⋮ | ⋮ | ⋮ | ⋮ | ⋮ |
| $T_9$ | $N_9$ | $M_9$ | 9 | EARLY |
| $T_{10}$ | $N_{10}$ | $M_{10}$ | 10 | APPROPRIATE |
| $T_{11}$ | $N_{11}$ | $M_{11}$ | 11 | APPROPRIATE |
| $T_{12}$ | $N_{12}$ | $M_{12}$ | 12 | APPROPRIATE |
| $T_{13}$ | $N_{13}$ | $M_{13}$ | 13 | LATE |

US 11,345,167 B2

INFORMATION PROCESSING APPARATUS, LEARNING APPARATUS, AND STORAGE MEDIUM STORING LEARNT MODEL

The present application is based on, and claims priority from JP Application Serial Number 2019-083790, filed Apr. 25, 2019, the disclosure of which is hereby incorporated by reference herein in its entirety.

BACKGROUND

1. Technical Field

The present disclosure relates to an information processing apparatus, a learning apparatus, and a storage medium storing a learnt model.

2. Related Art

In general, an adjustment process of adjusting a print position is performed to suppress degradation of print quality of print apparatuses. Furthermore, a method for automatically performing the adjustment process using a sensor observing a result of printing has been proposed. For example, JP-A-2010-52438 discloses a method for adjusting a shift of a print position in a main scanning direction using an optical sensor.

In general, the adjustment process of adjusting a print position is performed in response to an instruction of a user as a trigger. When a timing of the adjustment process is late, print quality is degraded and vertical streaks and the like may be generated. Furthermore, when the timing of the adjustment process is early, a test pattern is required to be printed in the adjustment process, and therefore, print media and ink may be excessively consumed. Therefore, an instruction for executing the adjustment process is required to be issued by the user at an appropriate adjustment interval. However, a degree of a shift of a print position varies depending on a use environment of the print apparatus. Therefore, it is difficult to perform the adjustment process at an appropriate interval.

SUMMARY

According to an aspect of the present disclosure, an information processing apparatus includes a storage section configured to store a learnt model obtained by machine learning on a condition for an adjustment interval in accordance with a use state of a print apparatus, based on a data set in which use state information of the print apparatus is associated with adjustment interval information indicating an interval of performing an adjustment process for a print position on a print medium, a reception section configured to receive the use state information of the print apparatus, and a processor configured to perform a process of estimating the adjustment interval, based on the use state information received and the learnt model.

BRIEF DESCRIPTION OF THE DRAWINGS

FIG. 9 is a diagram illustrating an example of training data.

FIG. 11 is a diagram illustrating another example of training data.

DESCRIPTION OF EXEMPLARY EMBODIMENTS

Hereinafter, an embodiment will be described. Note that the embodiment described below does not unduly limit content described in claims. Furthermore, it is not necessarily the case that all components described in this embodiment are requirements.

1. Outline

Figure 1:
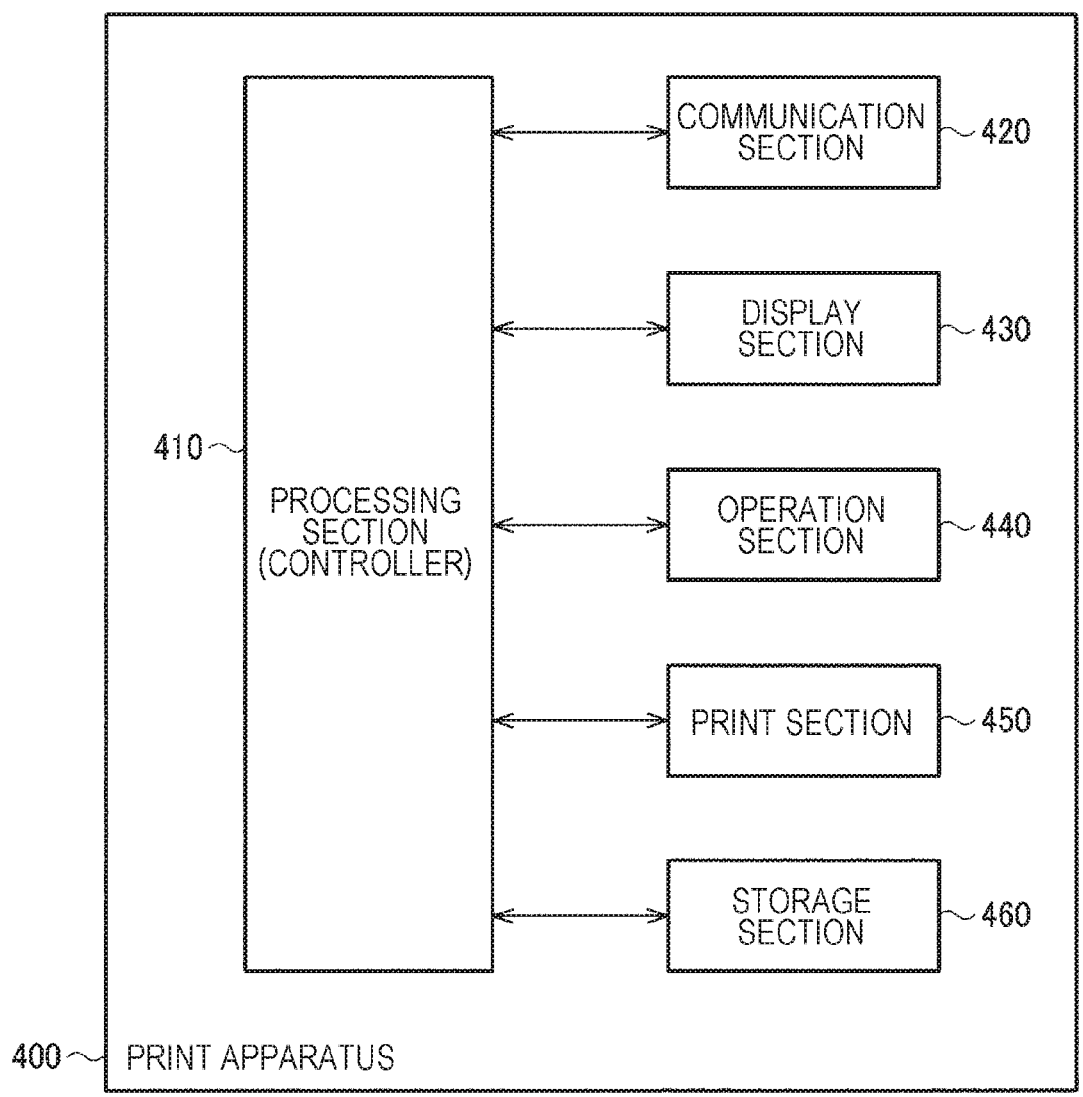
FIG. 1 is a diagram illustrating a configuration of a print apparatus.

FIG. 1 is a diagram illustrating a configuration of a print apparatus 400. The print apparatus 400 includes a processing section 410, a communication section 420, a display section 430, an operation section 440, a print section 450, and a storage section 460.

The processing section 410 controls the communication section 420, the display section 430, the operation section 440, the print section 450, and the storage section 460. The processing section 410 may include a plurality of central processing units (CPUs), such as a main CPU and a sub CPU, and a micro-processing unit (MPU). The main CPU controls the sections included in the print apparatus 400 and the entire print apparatus 400. The sub CPU performs various processes associated with printing, for example.

The communication section 420 which is a communication interface, such as a communication chip, performs communication with external apparatuses, such as a personal computer (PC) and a server system. The communication may be performed in a wired manner or a wireless manner. The display section 430 is constituted by a display or the like which displays various information for a user. The operation section 440 includes buttons which receive input operations performed by the user. Note that the display section 430 and the operation section 440 may be integrally configured as a touch panel, for example.

The print section 450 includes a print engine. The print engine is a mechanical configuration which executes printing of an image on a print medium. The print engine includes a transport mechanism, a head 451 employing an ink jet method, and a driving mechanism for a carriage 452 including the head 451. The print engine prints an image on a print medium by causing the head 451 to eject ink on the print medium transported by the transport mechanism. Specifically, the head 451 includes a plurality of nozzles which individually eject ink. Although the print medium is a sheet hereinafter as an example, fabric or the like may be used as the print medium.

The storage section 460 stores various information including data and programs. The processing section 410 and the communication section 420 operate using the storage section 460 as a work area, for example. The storage section 460 may be a semiconductor memory, a register, a magnetic storage apparatus, or an optical storage apparatus.

Figure 2:
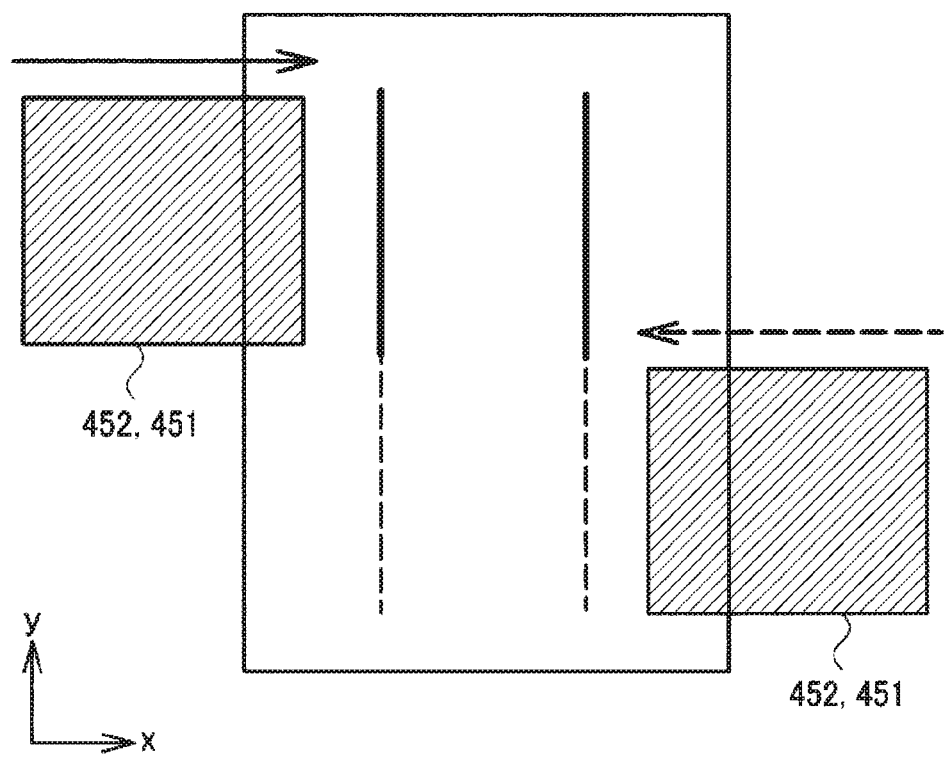
FIG. 2 is a diagram illustrating an appropriate print position.

FIG. 2 is a diagram illustrating driving of the head 451 and print positions when bidirectional printing is performed. The driving mechanism performs printing on the print medium by causing the carriage 452 including the head 451 to reciprocate in the main scanning direction. When the bidirectional printing is performed, ink is ejected both in a forward path and a backward path in the reciprocation. In FIG. 2, the main scanning direction is along an x axis, that is, a +x direction and an −x direction. Note that a position of the carriage 452 in the forward path is differentiated from a position of the carriage 452 in the backward direction in FIG. 2 so that print positions are clarified. However, transport of the print medium performed by the transport mechanism in the sub-scanning direction may be performed after the reciprocation. Note that the sub-scanning direction corresponds to a +y direction in FIG. 2.

Figure 3:
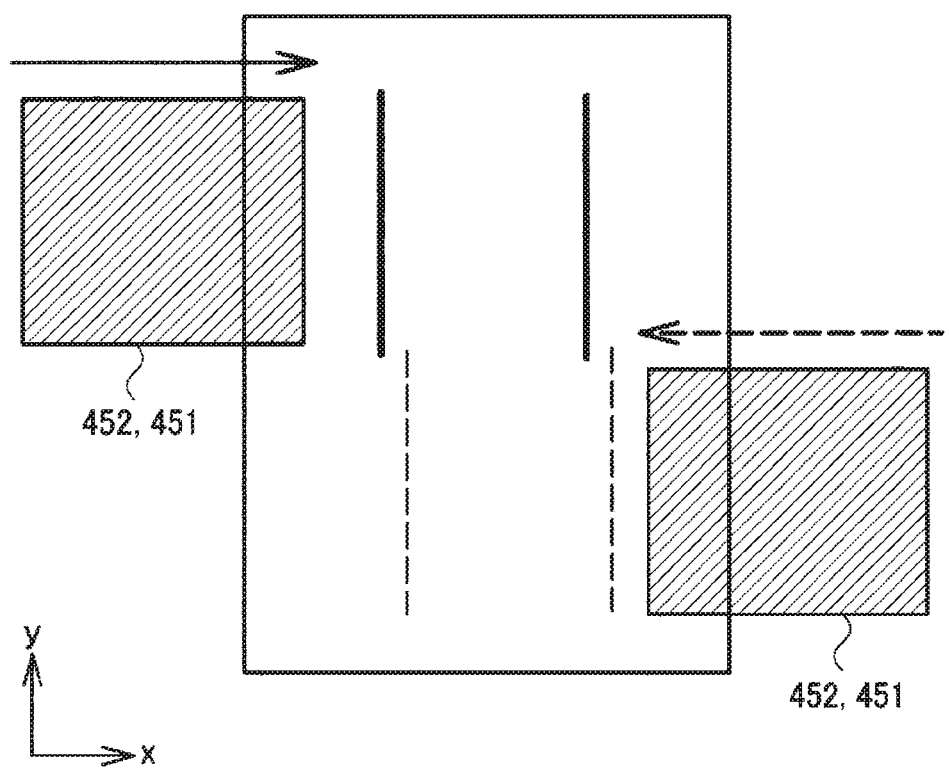
FIG. 3 is a diagram illustrating a shift of a print position.

In FIG. 2, the print position in the forward path and the print position in the backward path obtained when the printing is performed on appropriate positions of the print medium are illustrated. Specifically, the print position in the forward path and the print position in the backward path match each other in the main scanning direction. Since a result of the printing in the forward path and a result of the printing in the backward path have the appropriate positional relationship in the example of FIG. 2, high-quality printing may be performed. Note that the printing positions may not strictly match each other but may substantially match each other. Specifically, the printing positions may be shifted within a range in which the user does not recognize degradation of print quality. On the other hand, in FIG. 3, a print position in the forward path and a print position in the backward path which are clearly shifted from each other are illustrated. In the state in which the print position in the forward path and the print position in the backward path are shifted from each other as illustrated in FIG. 3, vertical streaks or the like may be generated as a result of printing of an image or the like, and therefore, low quality printing is performed. To suppress the degradation of the print quality in the bidirectional printing, an adjustment process of correcting the shift between the print positions is performed. The adjustment process is also referred to as Bi-D adjustment.

Figure 4:
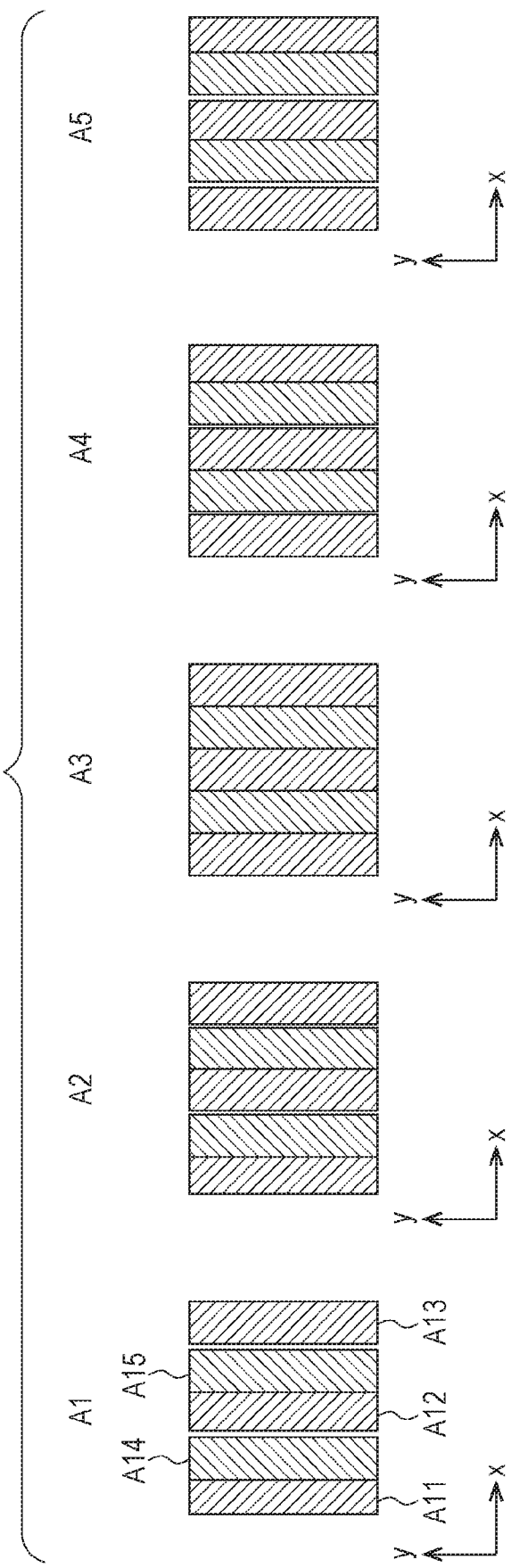
FIG. 4 is a diagram illustrating an example of a test pattern for adjusting a print position in a main scanning direction.
Figure 5:
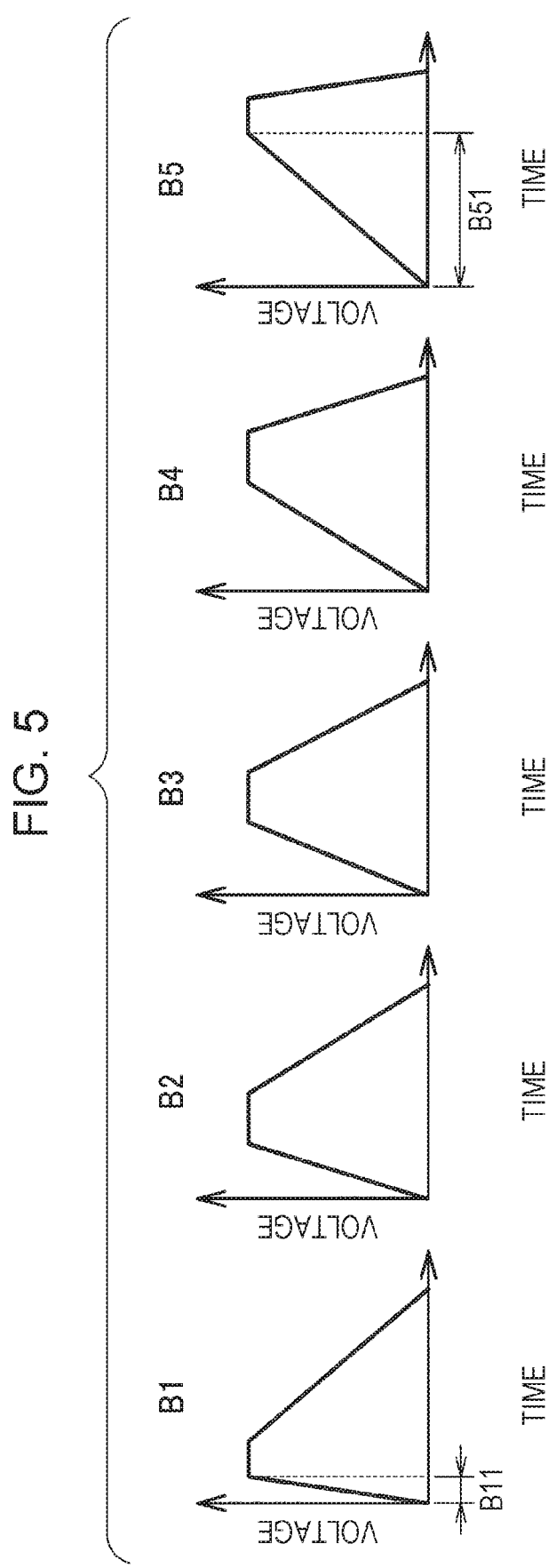
FIG. 5 is a diagram illustrating an example of adjustment of a voltage waveform for ejecting ink droplets.

An amount of correction by the Bi-D adjustment is determined by printing a test pattern on a print medium. In FIG. 4, A1 to A5 indicate test patterns. B1 to B5 in FIG. 5 indicate voltage waveforms applied to eject ink droplets from nozzles disposed on the head 451. For example, the print apparatus 400 employs a piezoelectric method, and therefore, ejects ink droplets using a piezoelectric element. As illustrated in FIG. 5, a timing, and an amount of ejection of ink droplets are changed when a waveform of a voltage applied to a piezoelectric element is changed, and therefore, an amount of correction of the print positions may be adjusted. In the examples of B1 to B5, a period of time when an initial value of a voltage reaches a maximum value is adjusted. For example, a period of time B11 until the voltage value reaches a peak in B1 is shorter than a period of time B51 in B5. A plurality of patterns have respective correction amounts which are different from one another by a predetermined difference.

It is assumed that a voltage waveform in the forward path is fixed and a voltage waveform in the backward path is changed in accordance with a pattern illustrated in FIG. 5. In this case, a print position in the forward path is changed, and therefore, different patterns are printed as indicated by A1 to A5 of FIG. 4. For example, A11 to A13 of FIG. 4 indicate regions in which the ink is ejected in the forward path, and A14 and A15 indicate regions in which the ink is ejected in the backward path. The same is true to A2 to A5, and a plurality of rectangle regions are printed both in the forward path and the backward path. In FIG. 4, a state in which the rectangle regions printed in the forward path and the rectangle regions printed in the backward path do not overlap with each other and do not have a gap therebetween, for example.

The print apparatus 400 assigns pattern numbers to the plurality of patterns included in the test pattern and prompts the user to select an appropriate pattern number, that is, a pattern corresponding to A3. Alternatively, the print apparatus 400 may include a sensor, such as a camera, and automatically select an appropriate pattern based on a result of sensing performed by the sensor. Since a voltage waveform is associated with a pattern number in the print apparatus 400, a voltage waveform for adjustment of a print position may be determined when an appropriate pattern number is specified. In other words, the print apparatus 400 may determine a correction amount in the Bi-D adjustment. Note that both the print positions in the forward and backward paths may be adjusted, and a concrete method of the Bi-D adjustment is not limited to that described above.

Furthermore, a shift between the print positions on the print medium is not limited to a shift in the main scanning direction. For example, when the transport mechanism for transporting a print medium is deteriorated, a transport amount of the print medium may be changed, and therefore, print positions in the sub-scanning direction may be shifted relative to original positions. When the print positions in the sub-scanning direction are shifted, horizontal streaks may be observed as a result of printing. Therefore, the print apparatus 400 performs an adjustment process of correcting a shift between print positions in the sub-scanning direction. The adjustment process is also referred to as PF adjustment.

Figure 6:
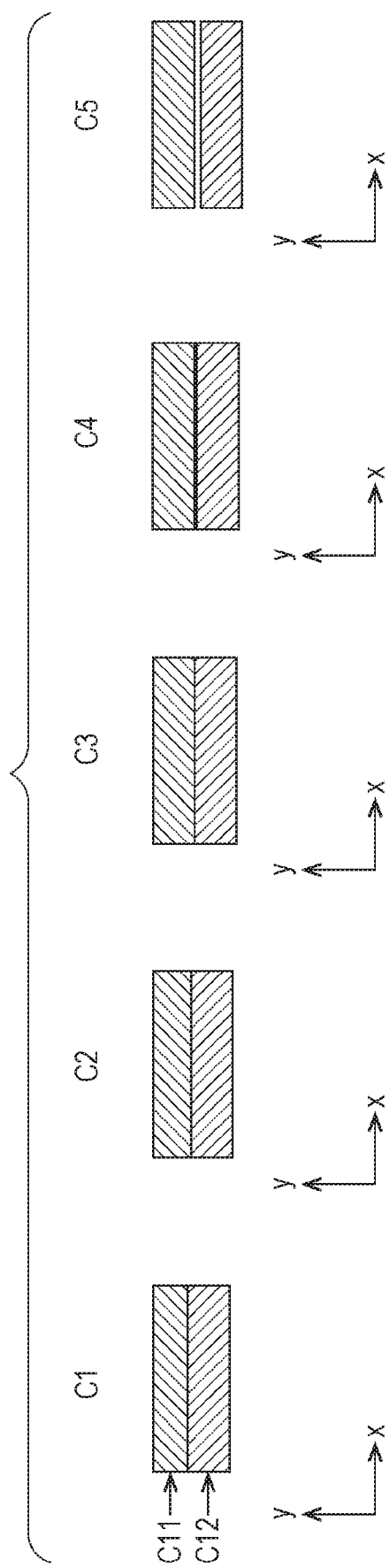
FIG. 6 is a diagram illustrating an example of a test pattern for adjusting a print position in a sub-scanning direction.

Also in the PF adjustment, the print section 450 prints a test pattern including a plurality of patterns. C1 to C5 of FIG. 6 indicate test patterns of the PF adjustment. The print section 450 forms a plurality of correction patterns by differentiating a transport amount of the transport mechanism by a predetermined difference. Specifically, a plurality of patterns indicated by C1 to C5 in FIG. 6 are printed. In the example of C1, the print section 450 first prints a rectangle region C11 before transporting the print medium by a predetermined transport amount, and prints a rectangle region C12 after the transport of the print medium. The same is true to C2 to C5. In this way, a pattern including a plurality of rectangle regions arranged in parallel in the sub-scanning direction is printed on the print medium in the PF adjustment. In FIG. 6, a state in which the plurality of rectangle regions do not overlap with each other and do not have a gap therebetween is an appropriate state, for example. Specifically, a transport amount for performing printing corresponding to C3 is an appropriate transport amount. Also in the PF adjustment, an appropriate pattern number is required to be determined based on the printed test pattern, and the determination may be made based on an input by the user or automatically performed using a camera or the like.

Note that the shift between print positions on a print medium similarly occurs in print apparatuses employing other methods. An example of an ink jet printer will be described hereinafter. However, the method of this embodiment may be widely employed in print apparatuses employing other methods.

As described above, the adjustment process of this embodiment includes at least one of the process of adjusting print positions in the sub-scanning direction corresponding to the transport direction of print media and the process of adjusting print positions in the main scanning direction intersecting the sub-scanning direction. The adjustment process in the main scanning direction is specifically the Bi-D adjustment and the adjustment process in the sub-scanning direction is the PF adjustment. As the adjustment process, both the Bi-D adjustment and the PF adjustment may be performed or only one of the Bi-D adjustment and the PF adjustment may be performed.

Furthermore, the adjustment process in this embodiment may include adjustment associated with a rotation and an inclination of the head 451. In this way, the shift between print positions on a print medium may be appropriately adjusted, and therefore, degradation of print quality may be suppressed. Note that, when the print apparatus 400 including inks of a plurality of colors and toners is used, the adjustment processes may be performed for individual colors or performed on one of the colors.

The shift between print positions may occur due to various factors. Examples of the factors include a deterioration of components of the driving mechanism or the transport mechanism, such as the carriage, deterioration of components associated with the nozzles, such as the piezoelectric element, and a change in a characteristic of the ink, such as viscosity. A degree of the deterioration of the components and a degree of the change in the characteristics considerably depend on a use state of the print apparatus 400. For example, in an extremely low or high temperature environment, the deterioration of the components are larger than that in an appropriate temperature environment. Furthermore, a degree of the deterioration in the print apparatus 400 which frequently performs printing and a degree of the deterioration in the print apparatus 400 which rarely performs printing are different. Moreover, even in the same print apparatus 400, a degree of time degradation is changed depending on years in use.

As described above, an amount of a shift between print positions is changed depending on a use state of the print apparatus 400. Therefore, it is not easy to estimate an appropriate interval for performing the adjustment process. Hereinafter, an execution interval of the adjustment process is referred to as an adjustment interval. When the adjustment process is to be performed in a fixed timing, such as once in several months, for example, print quality may be degraded to an extent that the user may not allow the degradation before the adjustment process is performed. In this case, after the shift between print positions is corrected by performing the adjustment process, the same print data is required to be printed again. Therefore, ink and print media are unnecessarily used and a period of time required for the print process is increased. When a business printer which performs a large amount of printing is used and print quality of the printer is degraded, a large number of printed matters are to be discarded, and therefore, the shift between print positions is a major issue which is directly linked to loss.

A number of users who use the business printer make sure to execute the adjustment process before printing is performed on a large number of sheets. In this way, the print quality is maintained, and therefore, inappropriate printing may be suppressed. However, as described above with reference to FIGS. 4 and 6, the printing of a test pattern is required in the adjustment process. Since ink and print media are consumed by the adjustment process, cost is increased when the adjustment process is performed an excessively large number of times.

As described above, although the problems arise when the adjustment interval is long or even short, it is generally difficult to estimate an appropriate adjustment interval. Therefore, in this embodiment, machine learning is performed using information on a use state of the print apparatus 400 so that an appropriate adjustment interval is estimated. By this, an appropriate adjustment interval may be estimated with high accuracy. Accordingly, the degradation of print quality may be suppressed while the consumption of print media and the like in the adjustment process may be suppressed. Hereinafter, the method will be described in detail.

2. Learning Process

2.1 Example of Configuration of Learning Apparatus

Figure 7:
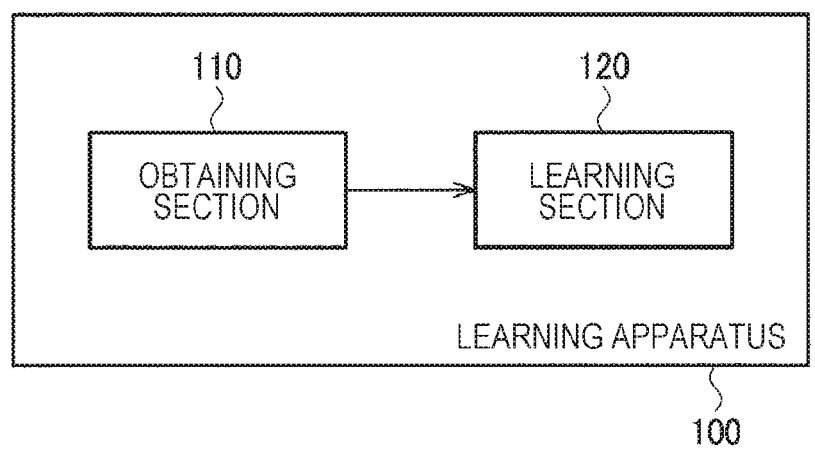
FIG. 7 is a diagram illustrating an example of a configuration of a learning apparatus.

FIG. 7 is a diagram illustrating a configuration of a learning apparatus 100. The learning apparatus 100 includes an obtaining section 110 which obtains training data to be used in learning and a learning section 120 which performs machine learning based on the training data.

The obtaining section 110 is a communication interface which obtains training data from another apparatus, for example. Alternatively, the obtaining section 110 may obtain training data stored in the learning apparatus 100. For example, the learning apparatus 100 includes a storage section, not illustrated, and the obtaining section 110 serves as an interface which reads training data from the storage section. The learning in this embodiment is supervised learning, for example. Training data in the supervised learning corresponds to a data set in which input data and a correct label are associated with each other.

The learning section 120 performs machine learning based on the training data obtained by the obtaining section 110 so as to generate a learnt model. Note that the learning section 120 of this embodiment is configured by hardware described below. The hardware may include at least one of a circuit which processes digital signals and a circuit which processes analog signals. For example, the hardware may be configured by at least one circuit apparatus or at least one circuit element implemented on a circuit substrate. The at least one circuit apparatus is an integrated circuit (IC), for example. The at least one circuit element is a resistance or a capacitor, for example.

Furthermore, the learning section 120 may be realized by a processor below. The learning apparatus 100 of this embodiment includes a memory storing information and a processor operating based on the information stored in the memory. Examples of the information include programs and various data. The processor includes hardware. Various types of processor may be used, such as a CPU, a graphics processing unit (GPU), and a digital signal processor (DSP).

Examples of the memory include a semiconductor memory, such as a static random access memory (SRAM) and a dynamic random access memory (DRAM), a register, a magnetic storage apparatus, such as a hard disk apparatus, and an optical storage apparatus, such as an optical disc apparatus. For example, the memory stores computer readable instructions, and when the instructions are executed by the processor, functions of the sections included in the learning apparatus 100 are realized as processes. Examples of the instructions may include an instruction set which configures a program and an instruction for instructing an operation of the hardware circuit of the processor. For example, the memory stores a program which specifies a learning algorithm and the processor operates in accordance with the learning algorithm so as to execute the learning process.

Specifically, the obtaining section 110 obtains use state information indicating a use state of the print apparatus 400 and information on an adjustment interval. The learning section 120 performs machine learning on the relationship between a use state and an appropriate adjustment interval based on a data set in which the use state information and the adjustment interval information are associated with each other.

The adjustment interval information indicates an interval from when a certain adjustment process is executed to when a succeeding adjustment process is executed. However, the adjustment interval information in this embodiment is not limited to information on an actual interval of the adjustment process. For example, as described below with reference to FIG. 9, in a step of obtaining training data, the adjustment process may not be performed until print quality is degraded. The adjustment process is not actually performed in an interval of 12 months indicated by D2 in FIG. 9, and as a result, print quality is degraded when 13 months has elapsed. However, when data is analyzed in time series, it becomes apparent that the adjustment process should have been performed in the interval of 12 months. The interval of 12 months is information on an appropriate adjustment interval, and therefore, is included in the adjustment interval information of this embodiment. The adjustment interval information of this embodiment includes an elapsed time after a preceding adjustment process in the broad sense.

According to the method of this embodiment, an appropriate adjustment interval may be obtained by machine learning in accordance with an actual use state of the print apparatus 400, and therefore, an appropriate adjustment interval may be accurately estimated using a result of the learning. For example, an adjustment interval which realizes both of maintenance of the print quality and suppression of consumption of ink and print media due to the adjustment process may be estimated and proposed.

The learning apparatus 100 illustrated in FIG. 7 may be included in the print apparatus 400 illustrated in FIG. 1, for example. In this case, the learning section 120 corresponds to the processing section 410 of the print apparatus 400. The print apparatus 400 stores sensing data, such as temperature information, and information on print history and the like as operation information. The obtaining section 110 may be an interface which reads the information stored in the storage section 460. Furthermore, the print apparatus 400 may transmit the stored operation information to an external apparatus, such as a server system. The obtaining section 110 may correspond to the communication section 420 which receives training data required for the learning from the external apparatus.

Furthermore, the learning apparatus 100 may be included in an apparatus different from the print apparatus 400. For example, the learning apparatus 100 may be included in an external apparatus which collects the operation information of the print apparatus 400 or another apparatus which is available for communication with the external apparatus.

2.2 Neural Network

Figure 8:
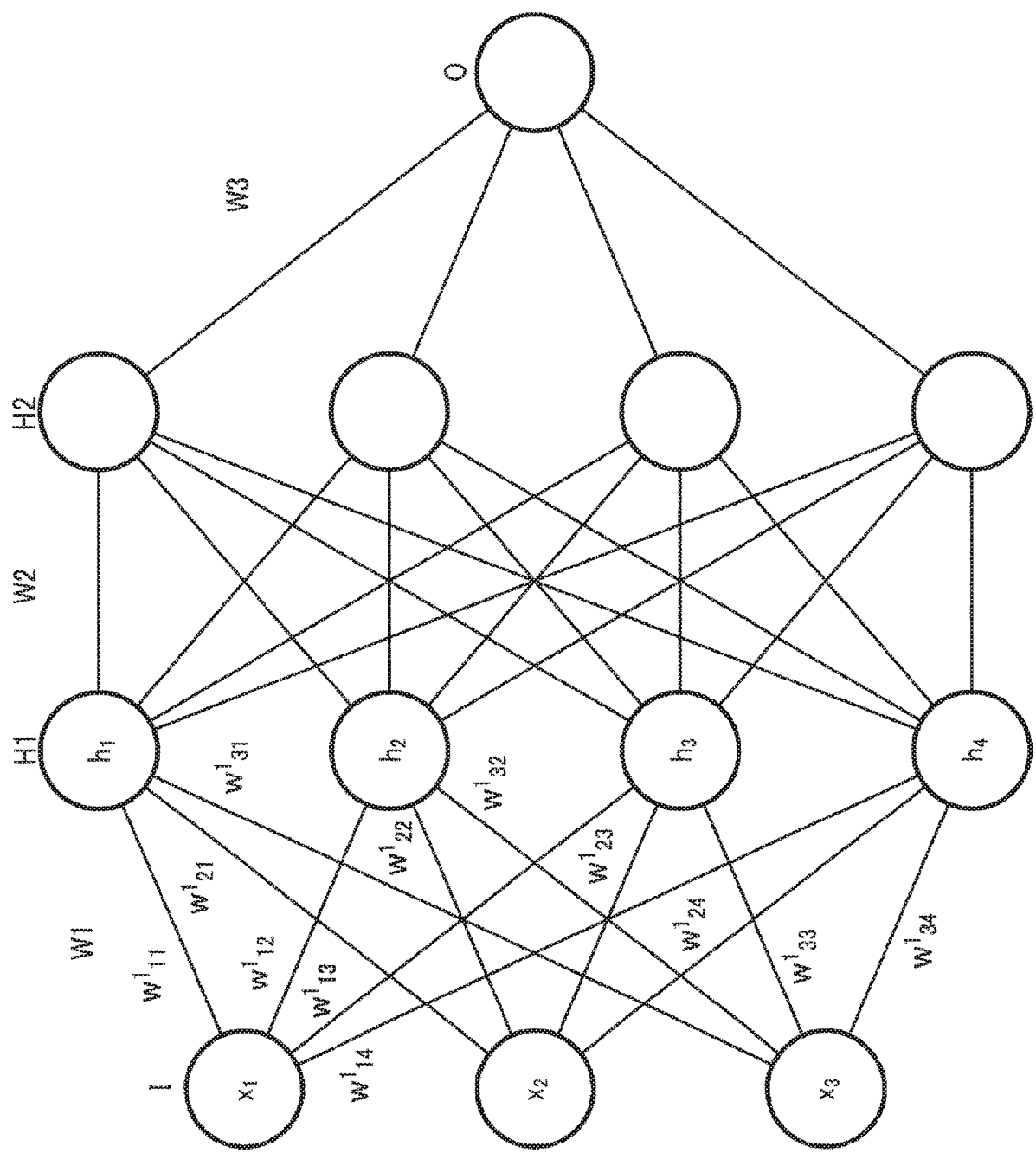
FIG. 8 is a diagram illustrating a neural network.

Machine learning using a neural network will be described as a concrete example of machine learning. FIG. 8 is a diagram illustrating a basic configuration of a neural network. The neural network is a mathematical model for simulating a brain function using a calculator. Each circle in FIG. 8 indicates a node or a neuron. In the example of FIG. 8, the neural network includes an input layer, two intermediate layers, and an output layer. The input layer is indicated by I, the intermediate layers are indicated by H1 and H2, and the output layer is indicated by O. In the example of FIG. 8, the number of neurons in the input layer is three, the number of neurons in each of the intermediate layers is four, and the number of neurons in the output layer is one. Note that the number of intermediate layers and the number of neurons included in each layer may be variously modified. Each of the neurons included in the input layer is coupled to the neurons included in the first intermediate layer H1. Each of the neurons included in the first intermediate layer is coupled to the neurons included in the second intermediate layer H2, and each of the neurons included in the second intermediate layer is coupled to the neuron in the output layer. Note that the intermediate layers may be rephrased as hidden layers.

The input layer includes neurons which output respective input values. In the example of FIG. 8, the neural network receives $x_1$, $x_2$, and $x_3$ as inputs, and the neurons included in the input layer output $x_1$, $x_2$, and $x_3$, respectively. Note that each of the neurons included in the input layer may perform certain preprocessing on the input value and output a value obtained as a result of the preprocessing.

Each of the neurons included in the intermediate layers and the subsequent layers performs a calculation for simulating a transmission of information as an electric signal in a brain. In a brain, easiness of transmission of information varies in accordance with a coupling degree of synapses, and therefore, the coupling degree is represented by a weight W in the neural network. In FIG. 8, W1 indicates a weight between the input layer and the first intermediate layer. W1 indicates an aggregate of a certain one of the neurons included in the input layer and a certain one of the neurons included in the first intermediate layer. Assuming that a weight between a p-th neuron included in the input layer and a q-th neuron included in the first intermediate layer is represented by $w^1_{pq}$, W1 of FIG. 8 is information including 12 weights $w^1_{11}$ to $w^1_{34}$. The weight W1 is information on a number of weights corresponding to a product of the number of neurons included in the input layer and the number of neurons included in the first intermediate layer in the broad sense.

In the first intermediate layer, a calculation indicated by Expression (1) is performed on a first neuron. In a certain one of the neurons, a product sum of outputs of neurons in a preceding layer coupled to the certain neuron is obtained and a bias is added to the product sum. In Expression (1), $b_1$ indicates the bias.

$$h_1 = f\left(\sum_i w_{i1}^1 \cdot x_i + b_1\right) \quad (1)$$

Furthermore, as illustrated in Expression (1) above, an activating function f which is a non-linear function is used in the calculation of a single neuron. The ReLU function illustrated in Expression (2) is used as the activating function, for example. The ReLU function has a value of 0 when a variable is 0 or less and has a value of a variable itself when the variable is larger than 0. Note that various functions may be used as the activating function f, and the sigmoid function may be used or a function obtained by modifying the ReLU function may be used. Although a calculation formula about $h_1$ is illustrated in Expression (1) above, the same calculation is performed on the other neurons in the first intermediate layer.

$$f(x) = \max(0, x) = \begin{cases} 0 (x \le 0) \\ x (x \ge 0) \end{cases} \quad (2)$$

Furthermore, the same is true to the subsequent layers. Assuming that a weight between the first and second intermediate layers is denoted by W2, a product sum calculation is performed on the neurons included in the second intermediate layer using outputs of the first intermediate layer and the weight W2, a bias is added to the resultant product sum, and the activating function is applied. In the neuron included in the output layer, outputs of the preceding layer are subjected to weighting addition and a bias is added to a resultant value of the weighting addition. In the example of FIG. 8, a preceding layer of the output layer is the second intermediate layer. The neural network determines a result of the calculation in the output layer as an output thereof.

As is apparent from the description above, an appropriate weight and an appropriate bias are required to be set to obtain a desired output from inputs. Note that the weight is also referred to as a weighting coefficient hereinafter. Furthermore, the weighting coefficient may include a bias. In the learning, a data set in which a certain input x and an appropriate output relative to the input x are associated with each other is provided. The appropriate output corresponds to a correct label. The learning process in the neural network may be seen to be a process of obtaining a highest probable weighting coefficient based on the data set. Note that various learning methods, such as the backpropagation, are used in the learning process of the neural network. In this embodiment, the learning methods are widely applicable, and therefore, detailed descriptions thereof are omitted. In a learning algorithm for use of the neural network, both of a process of performing the calculation of Expression (1) above or the like so as to obtain a result in a forward direction and a process of updating information on a weighting coefficient using the backpropagation are performed.

Furthermore, a configuration of the neural network is not limited to that illustrated in FIG. 8. For example, in the learning process and the estimation process described below in this embodiment, a convolutional neural network (CNN) which is widely used, for example, may be used. The CNN includes a convolutional layer and a pooling layer. A convolutional calculation is performed in the convolutional layer. Here, the convolutional calculation is specifically a filter process. A process of reducing a horizontal and vertical size of data is performed in the pooling layer. In the CNN, when image information is input, for example, a process taking the relationship between a certain pixel and pixels in the vicinity of the certain pixel into consideration may be performed. For example, the CNN is useful when image data indicating a print image is used as an input of the neural network. In the CNN, features of a filter used in the convolutional calculation is learnt by the learning process using the backpropagation. Specifically, the weighting coefficient in the neural network includes the filter characteristics in the CNN.

Note that an example in which a learnt model uses a neural network is described hereinabove. However, machine learning in this embodiment is not limited to the method using a neural network. For example, various general machine learning methods, such as a support vector machine (SVM), or further developed machine learning methods may be applied as the method of this embodiment, for example.

2.3 Example of Training Data and Detailed Description of Learning Process

FIG. 9 is a diagram illustrating observational data obtained by the print apparatus 400 and training data obtained based on the observational data. For example, in a learning step, the print apparatus 400 periodically performs a process of determining print quality. Although the determination process is performed once a month, for example, according to FIG. 9, the present disclosure is not limited to this. In the determination process, the print apparatus 400 executes a normal print process and prompts the user to determine print quality. When the user visually recognizes vertical streaks or horizontal streaks, the user inputs information indicating that the print quality is abnormal. Alternatively, the print apparatus 400 may perform printing of the test pattern illustrated in FIG. 4 or FIG. 6 in the determination process. The print apparatus 400 may obtain an appropriate pattern number based on a user input and may specify an appropriate pattern number using a camera or the like. In this case, the print apparatus 400 determines that the print quality is abnormal when a correct amount determined by a pattern number is equal to or larger than a predetermined threshold value.

The print apparatus 400 obtains a use state information and an elapsed time at a timing when the determination process is performed and stores observational data obtained by associating the use state information with the elapsed time. The elapsed time is counted after a preceding adjustment process and is information on a candidate of an adjustment interval. The use state information includes at least one of temperature information, print frequency information and aging information. By this, an appropriate adjustment period may be estimated in accordance with a temperature, print frequency, and a use period.

The temperature information indicates a temperature in a use environment of the print apparatus 400. The temperature information preferably indicates a temperature in an inside of the print apparatus 400, or more specifically, a temperature in a portion in the vicinity of the head 451. For example, the head 451 includes a temperature sensor which obtains the temperature information, for example. Note that, in this embodiment, the temperature information at least roughly distinguishes low temperature from high temperature and precise temperature information is not required. Therefore, the temperature sensor which obtains the temperature information may be disposed in a position different from that of the head 451. Furthermore, although the temperature sensor is preferably disposed in the print apparatus 400, the present disclosure is not limited to this. For example, temperature information may be obtained in an outside of the print apparatus 400 as use state information. For example, the temperature information may be obtained from the temperature sensor disposed in a space where the print apparatus 400 is installed.

Furthermore, the temperature changes in accordance with the seasons and time. The adjustment interval is long to some extent, such as several months or more, and therefore, a large number of temperatures are obtained in the period of the adjustment interval. The temperature information of this embodiment may be an aggregate of temperatures obtained in time series. Note that accuracy of the temperature information is not required to be extremely high as described above. Therefore, the temperature information of this embodiment may indicate an average temperature. The average temperature herein may be an average in the entire period after a preceding adjustment process or an average in a latest predetermined period. Furthermore, the temperature information obtained last may be used as the use state information taking reduction of a load in the process of obtaining temperature information into consideration.

The print frequency information indicates frequency of execution of the print process performed by the target print apparatus 400. The print apparatus 400 obtains history information of print jobs. The print job is a unit of execution of a single print process performed by the print apparatus 400. Furthermore, the print job indicates an aggregate of data to be used in execution of a single print process. The print job includes identification information for uniquely identifying the print job, print image data to be printed, and print setting information. For example, the print frequency information indicates the total number of time print jobs are executed after a preceding adjustment process or the number of times print jobs are executed in a unit of time. In FIG. 9, the print frequency information indicates the number of times print jobs are executed a day, for example. Note that the number of sheets to be printed and an amount of ink to be consumed per sheet in printing are differentiated depending on print image data and print settings. A shift of print positions is seen to be larger as the driving mechanism and the transport mechanism are driven or ink is ejected. Therefore, the print frequency information may not be determined simply using the number of executed jobs but may be determined after adding detailed content of the print jobs. When ink consumption amount information in a print job is obtained, the print frequency information may be determined based on the ink consumption amount information. Specifically, the print frequency information at least indicates progress of printing executed by the target print apparatus 400, and a detailed format is not limited.

The aging information indicates a use period of the print apparatus 400. The aging information may indicate an elapsed time from production of the print apparatus 400, for example, or an elapsed time from a first use of the print apparatus 400. Although the aging information indicates an elapsed time in a unit of month, for example, in FIG. 9, a detailed format is not limited to this.

As described above, the temperature, the print frequency, and the use period are parameters which affect an amount of shift between print positions. Therefore, estimation accuracy of an adjustment interval may be improved when the parameters are included in the use environment information. Furthermore, the use state information in this embodiment is not limited to the temperature information, the print frequency information, and the aging information, and may include other information. For example, the use state information may include atmosphere pressure information and humidity information.

In the learning step, the print apparatus 400 continues obtainment of observational data without performing the adjustment process until it is determined that print quality is abnormal. In this way, observational data illustrated in FIG. 9, for example, is obtained.

When observational data denoted by D3 in FIG. 9 is obtained, the print quality is degraded to the extent that the print quality is not accepted, and therefore, the adjustment process is required to be performed before the obtainment of the observational data denoted by D3. That is, a period of 13 months is not appropriate as the adjustment interval, and the adjustment is required to be performed at a shorter adjustment interval.

On the other hand, when observational data denoted by D1 is obtained, print quality is normal, and therefore, the adjustment process performed at this timing may suppress inappropriate printing. However, since the normal print quality is maintained until 12 months have elapsed without performing the adjustment process at this timing, execution of the adjustment process at a timing after one month has elapsed is excessively frequent, and therefore, ink and print media are unnecessarily consumed.

Accordingly, in this embodiment, observational data obtained at a latest timing selected from among timings when it is determined that the print quality is normal is employed as training data. For example, among observational data in which print quality is determined to be normal, observational data obtained last is determined as training data. In the example of FIG. 9, the elapsed time of 12 months indicated by D2 is determined as an appropriate adjustment interval for a use condition in this embodiment. Note that an appropriate adjustment interval may have a certain margin, and a plurality of observational data including D2 may be employed as training data, for example. For example, it may be determined that an elapsed time in a range from 10 months to 12 months is an appropriate adjustment interval in the use state of this embodiment. By this, a data set in which the use state information and the appropriate adjustment interval are associated with each other may be obtained as training data.

Figure 10:
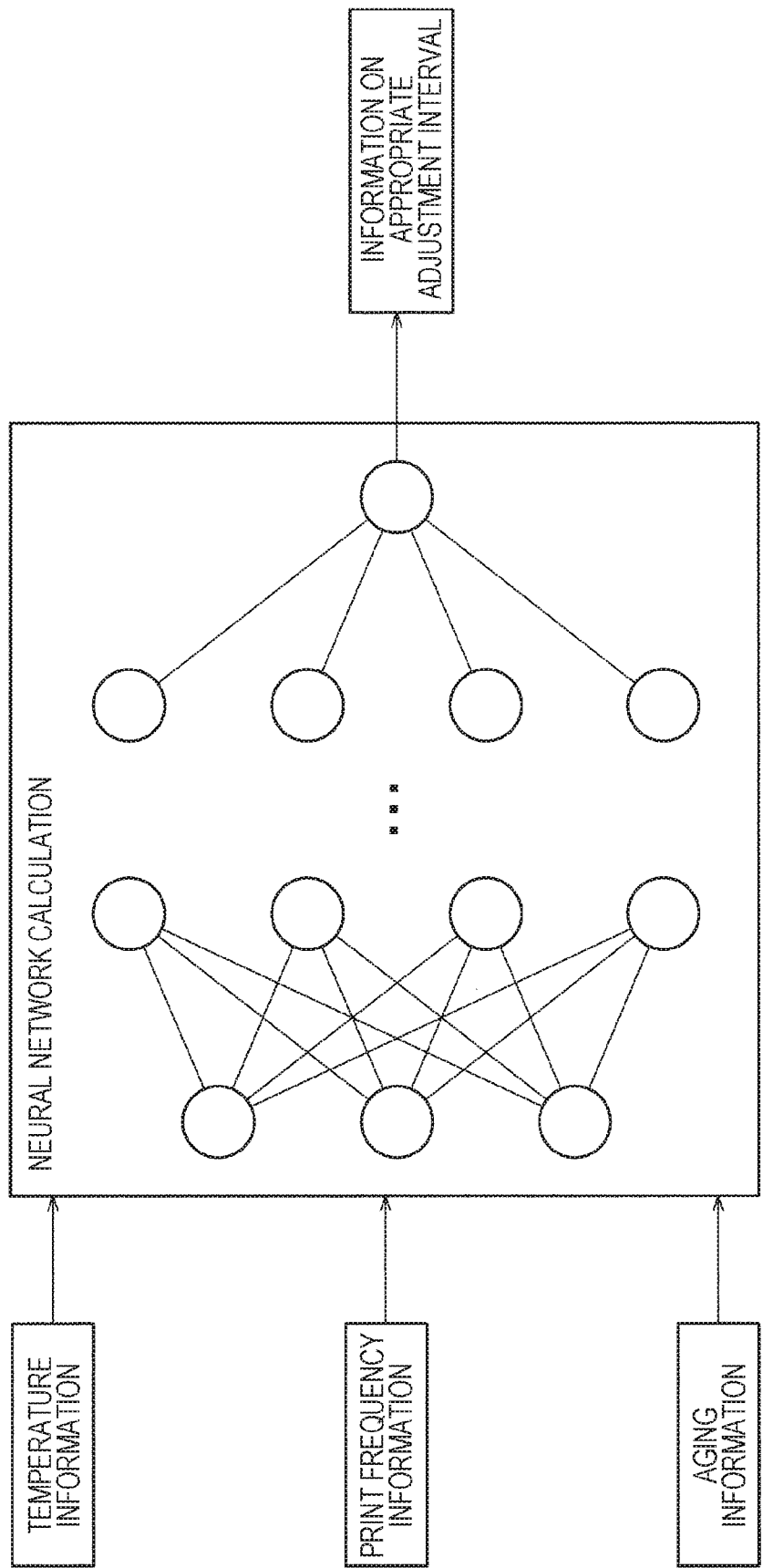
FIG. 10 is a diagram illustrating examples of inputs and an output of the neural network.

FIG. 10 is a diagram illustrating an example of a model of a neural network in this embodiment. The neural network receives use state information of the print apparatus 400 as inputs and outputs information indicating an appropriate adjustment interval in accordance with a use state as output data. The information indicating an adjustment interval is numerical value data indicating months of an adjustment interval, for example. However, information of another format may be employed.

For example, a learning process based on the training data in FIG. 9 is performed in accordance with the following flow. First, the learning section 120 inputs data to the neural network and performs a calculation in a forward direction using a weight obtained by the input of the data so as to obtain output data. When the training data illustrated in FIG. 9 is employed, the use state information is the input data. The output data obtained by the calculation in the forward direction is information indicating a recommended adjustment interval.

The learning section 120 calculates an error function based on the obtained output data and a correct label. When the training data illustrated in FIG. 9 is employed, for example, the correct label is adjustment interval information indicating an appropriate adjustment interval. The learning section 120 calculates a difference between the adjustment interval obtained as a result of the calculation in the forward direction and the adjustment interval corresponding to the correct label as an error function, and updates weighting coefficient information so that an error is reduced. Note that various types of error function are generally used, and such error functions may be widely employed in this embodiment. Furthermore, although the update of the weighting coefficient interval is performed using the backpropagation, for example, other methods may be employed.

The learning process based on single training data has been briefly described hereinabove. The learning section 120 learns appropriate weighting coefficient information by repeatedly performing the same process on other training data. Note that generally, accuracy of the learning process is improved when the number of training data is increased. Although the observational data obtained until the given print apparatus 400 performs a single adjustment process is illustrated in FIG. 9, a large amount of training data is preferably provided by obtaining observational data in a large number of adjustment processes. For example, the learning section 120 determines a portion of the obtained data as training data and remaining data as test data. The test data may be rephrased as evaluation data or verification data. Then the learning section 120 applies test data to a learnt model generated using the training data and performs learning until a correct rate becomes equal or larger than a predetermined threshold value.

As described above, the learning section 120 generates a learnt model by machine learning. The learnt model is used to determine an appropriate interval for performing the adjustment process for a print position on a print medium in accordance with a use state of the print apparatus 400. The information on a weighting coefficient is set in the learnt model having an input layer, an intermediate layer, and an output layer, based on a data set in which use state information and adjustment interval information are associated with each other. The information on a weighting coefficient includes a first weighting coefficient between the input layer and the intermediate layer and a second weighting coefficient between the intermediate layer and the output layer. The information on a weighting coefficient may include a weighting coefficient between a certain intermediate layer and a succeeding intermediate layer. The learnt model causes a computer to input use state information received as an input in the input layer, perform a calculation based on the set weighting coefficient information, and output information indicating a recommended adjustment interval in a use state indicated by the use state information. The learnt model is stored in a storage section 230 of the information processing device 200 as described below. Furthermore, the method of this embodiment may be applied to the learnt model.

Note that the training data is not limited to the example illustrated in FIG. 9. FIG. 11 is a diagram illustrating examples of observational data obtained by the print apparatus 400 and examples of training data obtained based on the observational data. The observational data is the same as that illustrated in FIG. 9.

As described above, a range of 13 months or more indicated by E3 is inappropriate as the adjustment interval, and the adjustment is required to be performed at a shorter adjustment interval. Therefore, the print apparatus 400 assigns determination result information represented as "late" to observational data indicated by E3. Furthermore, a range of 9 months or less indicated by E1 is inappropriate as the adjustment interval, and the adjustment is required to be performed at a longer adjustment interval. Therefore, the print apparatus 400 assigns determination result information represented as "early" to observational data indicated by E1. A range indicated by E2 is appropriate as the adjustment interval. Therefore, the print apparatus 400 assigns determination result information represented as "appropriate" to observational data indicated by E2. Note that a process of converting observational data to training data may be performed by the print apparatus 400, a server system or the like which collects operation information of the print apparatus 400, or the learning apparatus 100.

The training data in this embodiment may include determination result information indicating whether an adjustment interval is appropriate. For example, as illustrated in FIG. 11, each of the training data is obtained by associating the use state information, the adjustment interval information corresponding to an elapsed time after a preceding adjustment process, and the determination result information with one another. In the example of FIG. 11, the determination result information represents "early", "appropriate", or "late".

Figure 12:
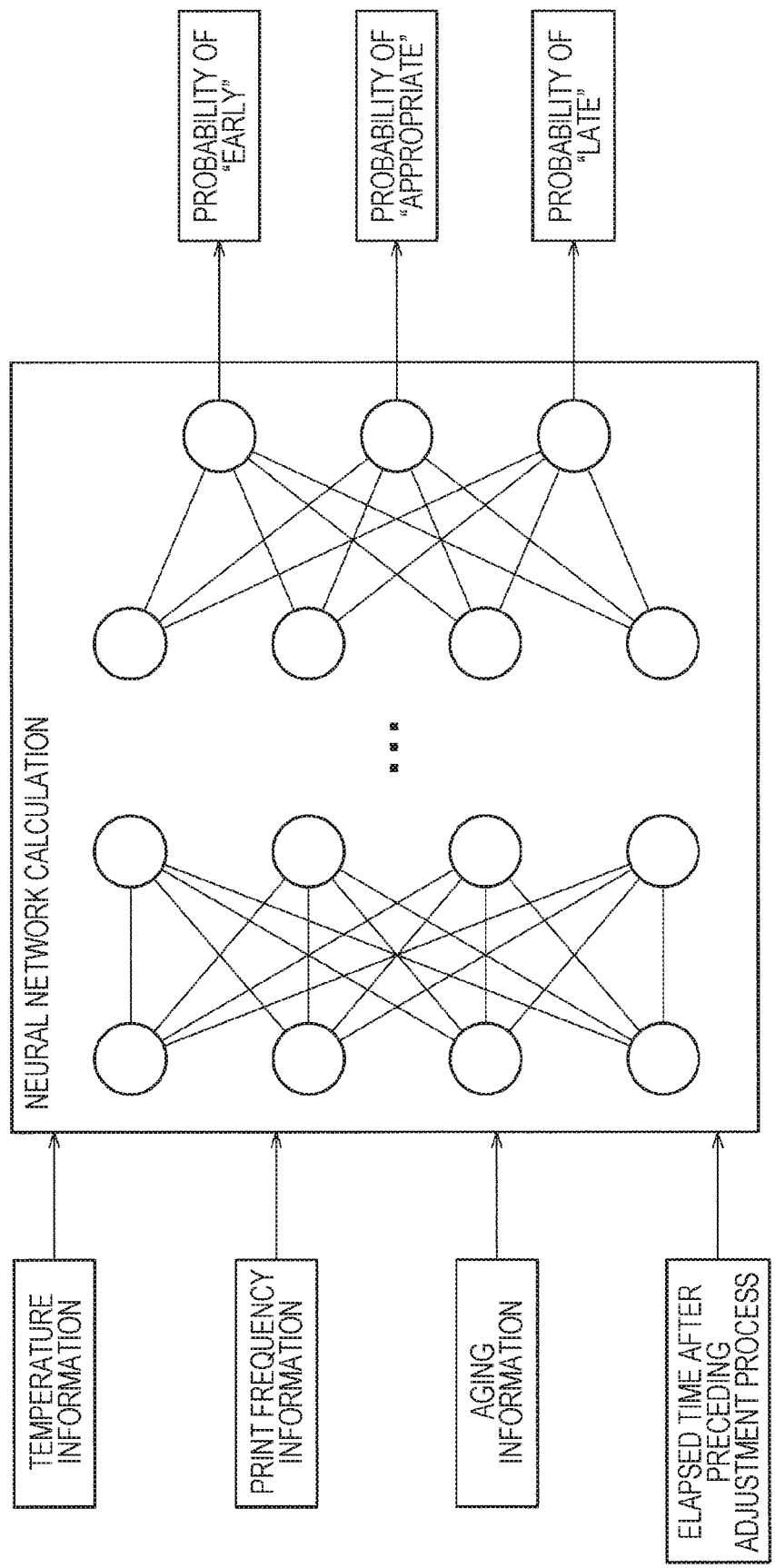
FIG. 12 is a diagram illustrating examples of inputs and outputs of the neural network.

FIG. 12 is a diagram illustrating an example of a model of a neural network according to this embodiment. The neural network receives use state information of the print apparatus 400 and adjustment interval information corresponding to an elapsed time. The neural network outputs information indicating the adjustment interval corresponding to "early", "appropriate", or "late" as output data when an adjustment interval indicated by the adjustment interval information is employed. A general softmax layer may be used as the output layer of the neural network. In this case, the output of the neural network is three probability data which are summed up to 1. The three probability data indicate a probability of "early", a probability of "appropriate", and a probability of "late" of the adjustment interval.

Note that the learning process based on the training data in FIG. 11 is also performed in accordance with the flow using the training data illustrated in FIG. 9. Note that, when the training data in FIG. 11 is used, the use state information and the adjustment interval information serve as the input data. Three probability data indicating "early", "appropriate", and "late", for example, are the output data obtained based on the use state information, the adjustment interval information, and the weighting coefficient information at this time. For example, when information included in the training data indicates "early", a correct label is information in which probability data indicating "early" is 1 and probability data indicating "appropriate" and probability data indicating "late" are 0. The learning section 120 performs a process of updating the weighting coefficient information so as to reduce an error among the three probability data.

Note that, when the print apparatus 400 having a plurality of colors of ink and a plurality of toners performs the adjustment process for individual colors, the learning process may be performed for individual colors. For example, the print apparatus 400 obtains observational data of cyan by printing a test pattern using a cyan ink and obtains training data based on the observational data. Furthermore, the print apparatus 400 obtains training data for individual colors, that is, magenta, yellow, black, and so on. The learning section 120 generates a number of learnt models corresponding to the number of colors based on the training data obtained for individual colors. Alternatively, the learning section 120 may generate a learnt model in which different adjustment intervals for different colors may be estimated by additionally using information indicating the ink colors or the toner colors as the inputs of the neural network. In this way, since the adjustment intervals may be estimated for individual colors, higher estimation accuracy may be obtained. For example, consumption of ink or print media may be suppressed by suppressing execution of unnecessary adjustment processes.

3. Estimation Process

3.1 Example of Configuration of Information Processing Apparatus

Figure 13:
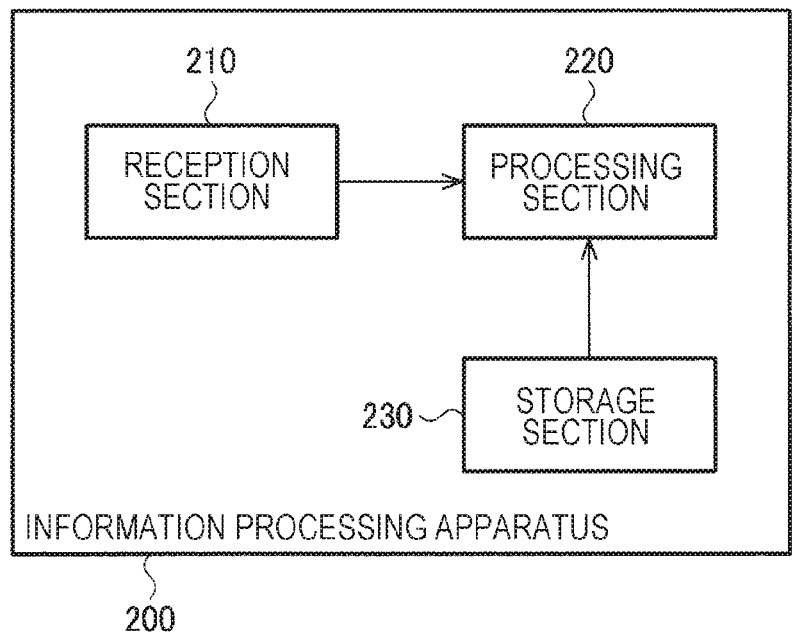
FIG. 13 is a diagram illustrating a configuration of an information processing apparatus.

FIG. 13 is a diagram illustrating an example of a configuration of an estimation apparatus according to this embodiment. The estimation apparatus corresponds to an information processing apparatus 200. The information processing apparatus 200 includes a reception section 210, a processing section 220, and a storage section 230.

The storage section 230 stores a learnt model obtained by machine learning on a condition for an appropriate adjustment interval in accordance with a use state based on a data set in which use state information and adjustment interval information are associated with each other. The reception section 210 receives use state information as an input. The processing section 220 determines information indicating a recommended adjustment interval in a use state indicated by the use state information received as the input based on the learnt model.

By this an appropriate adjustment interval may be estimated in accordance with a use state of the print apparatus 400. As described above, an appropriate adjustment interval considerably depends on a use state of the print apparatus 400. An appropriate adjustment interval may be estimated taking a detailed use state into consideration by estimating an adjustment interval using the use state information. Therefore, the user is prompted to execute the adjustment process at an appropriate timing.

Note that the learnt model is used as a program module which is a portion of artificial intelligence software. The processing section 220 outputs data indicating an appropriate adjustment interval corresponding to the input use state information in accordance with an instruction issued by the learnt model stored in the storage section 230.

The processing section 220 of the information processing apparatus 200 is configured by hardware including at least one of a circuit which processes digital signals and a circuit which processes analog signals, similarly to the learning section 120 of the learning apparatus 100. Furthermore, the processing section 220 may be realized by a processor described below. The information processing apparatus 200 of this embodiment includes a memory which stores information and a processor which operates based on the information stored in the memory. The processor may be any of processors including a CPU, a GPU, and DSP. The memory may be a semiconductor memory, a register, a magnetic storage apparatus, or an optical storage apparatus.

Note that a calculation performed by the processing section 220 in accordance with the learnt model, that is, a calculation for outputting output data based on input data may be executed by software or hardware. In other words, a product sum calculation of Expression (1) or the like may be executed by software. Alternatively, the calculation described above may be executed by a circuit apparatus, such as a field-programmable gate array (FPGA). Furthermore, the calculation described above may be executed by a combination of software and hardware. In this way, operation of the processing section 220 in accordance with an instruction issued by the learnt model stored in the storage section 230 may be realized in various modes. The learnt model includes an estimation algorithm and parameters used in the estimation algorithm, for example. The estimation algorithm is used to perform a product sum calculation of Expression (1) or the like based on the input data. The parameters are obtained by the learning process, such as the weighting coefficient information. In this case, both the estimation algorithm and the parameters may be stored in the storage section 230, and the processing section 220 may perform the estimation process by software by reading the estimation algorithm and the parameters. Alternatively, the estimation algorithm may be realized by the FPGA, and the storage section 230 may store the parameters.

The information processing apparatus 200 illustrated in FIG. 13 is included in the print apparatus 400 illustrated in FIG. 1, for example. In this case, the processing section 220 corresponds to the processing section 410 included in the print apparatus 400. The storage section 230 corresponds to the storage section 460 included in the print apparatus 400. The reception section 210 corresponds to an interface which reads use state information stored in the storage section 460. However, the information processing apparatus 200 may be included in an apparatus different from the print apparatus 400. The information processing apparatus 200 is included in an external apparatus, such as a server system which collects use state information from a plurality of print apparatuses 400, for example. The external apparatus performs a process of individually estimating recommended adjustment intervals for the print apparatuses 400 based on the collected use state information and transmitting the estimated information to the print apparatuses 400.

Figure 14:
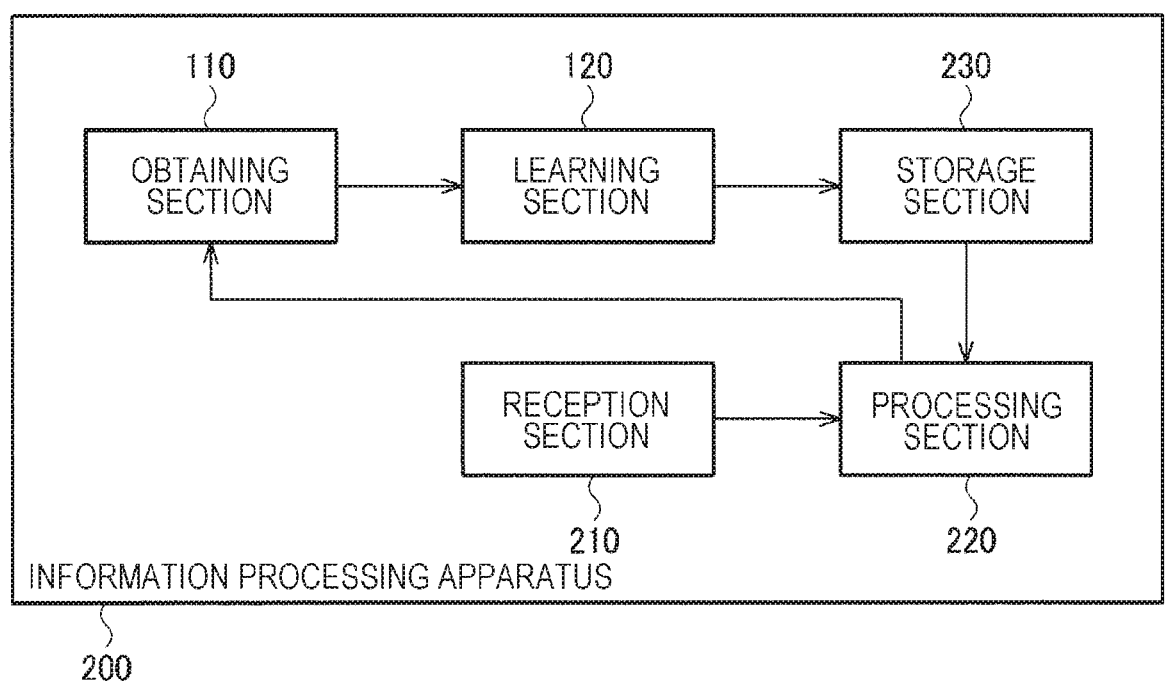
FIG. 14 is a diagram illustrating another configuration of the information processing apparatus.

The learning apparatus 100 and the information processing apparatus 200 are separately described in the foregoing description. However, the method of this embodiment is not limited to this. For example, as illustrated in FIG. 14, the information processing apparatus 200 may include an obtaining section 110 which obtains use state information and adjustment interval information and a learning section 120 which performs machine learning on a condition for an appropriate adjustment interval in accordance with a use state, based on a data set in which the use state information and the adjustment interval information are associated with each other. In other words, the information processing apparatus 200 includes a configuration corresponding to the learning apparatus 100 illustrated in FIG. 7 in addition to the configuration illustrated in FIG. 13. With this configuration, the learning process and the estimation process may be efficiently executed in the same apparatus.

3.2 Flow of Estimation Process

Figure 15:
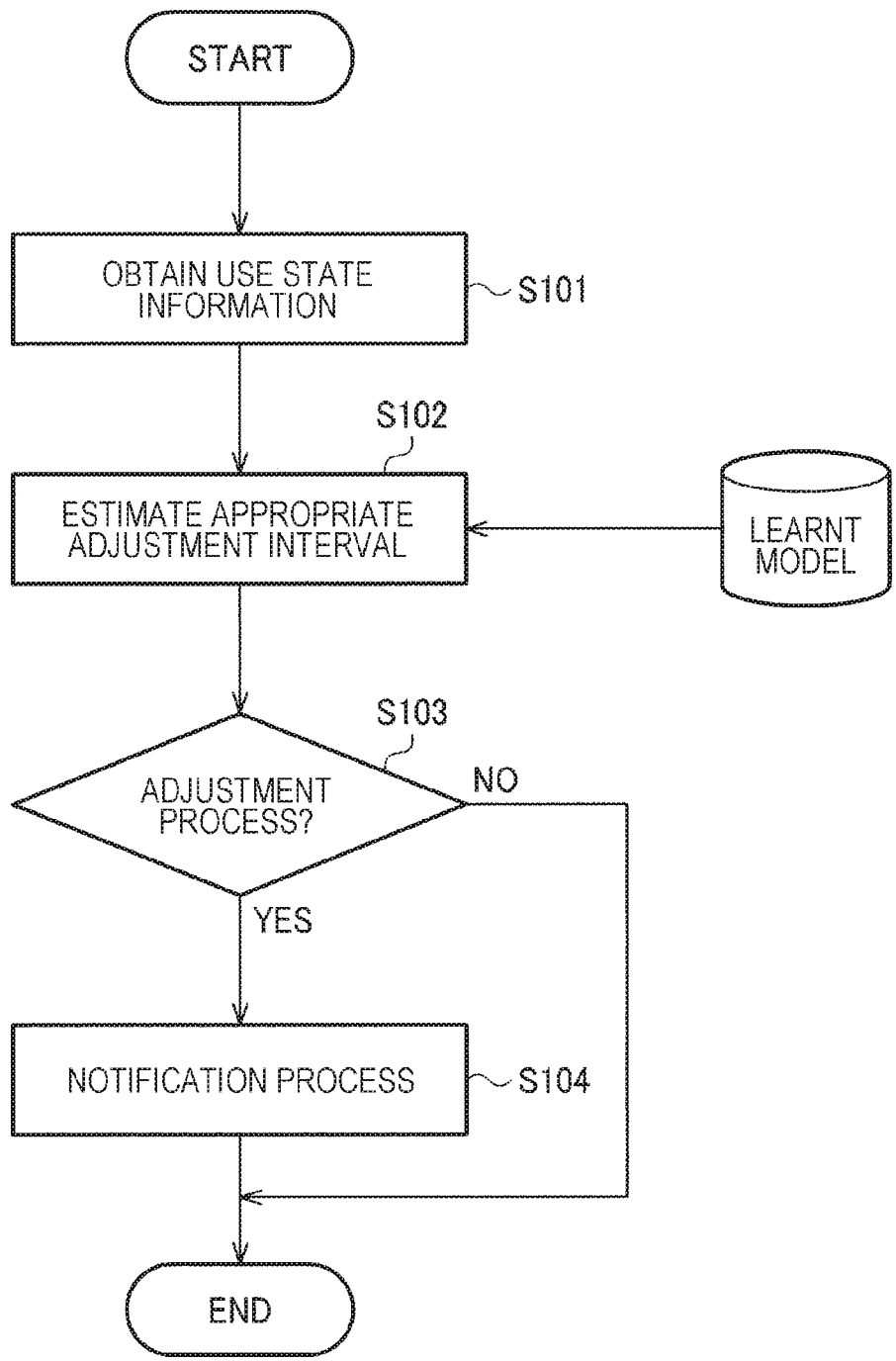
FIG. 15 is a flowchart of a process performed by the information processing apparatus.

FIG. 15 is a flowchart of a process performed by the information processing apparatus 200. When this process is started, first, the reception section 210 obtains use state information of the print apparatus 400 (S101). Note that the process in step S101 may include a process of calculating use state information to be used in the estimation process based on a large number of information. For example, the reception section 210 may perform a process of obtaining temperature information in time series and calculating an average temperature based on the temperature information obtained in time series.

When the use state information is obtained, the processing section 220 obtains an appropriate adjustment interval based on the use state information and the learnt model stored in the storage section 230 (S102). The process in step S102 obtains output data by inputting use state information as input data in the model illustrated in FIG. 10, for example.

Next, the processing section 220 determines whether the adjustment process is required to be performed (S103). In step S103, the processing section 220 performs a process of comparing an elapsed time from a preceding adjustment process to a current time with the adjustment interval estimated in step S102. When the elapsed time exceeds the adjustment interval, the processing section 220 determines that the adjustment process is required to be performed. Note that the processing section 220 may determine that the adjustment process is required to be performed when a difference between the elapsed time and the adjustment interval is equal to or smaller than a certain threshold value although the elapsed time does not excess the adjustment interval.

When it is determined that the adjustment process is required to be performed (Yes in S103), the processing section 220 performs a notification process for prompting execution of the adjustment process (S104). For example, the processing section 220 performs a process of displaying a screen for prompting the user to execute the adjustment process in the display section 430 of the print apparatus 400 (S104). However, the notification process is not limited to display, and light emission of a light emitting section, such as a light emitting diode (LED) or output of alert sound from a speaker may be executed. When the user instructs execution of the adjustment process in the notification screen, the processing section 220 instructs the print section 450 to perform printing of a test pattern illustrated in FIG. 4 or FIG. 6. On the other hand, when it is determined that the adjustment process is not required to be performed (No in S103), the processing section 220 terminates the process without performing the notification process.

The information processing apparatus 200 enables the user to execute the adjustment process at an appropriate timing by periodically executing the process illustrated in FIG. 15.

Figure 16:
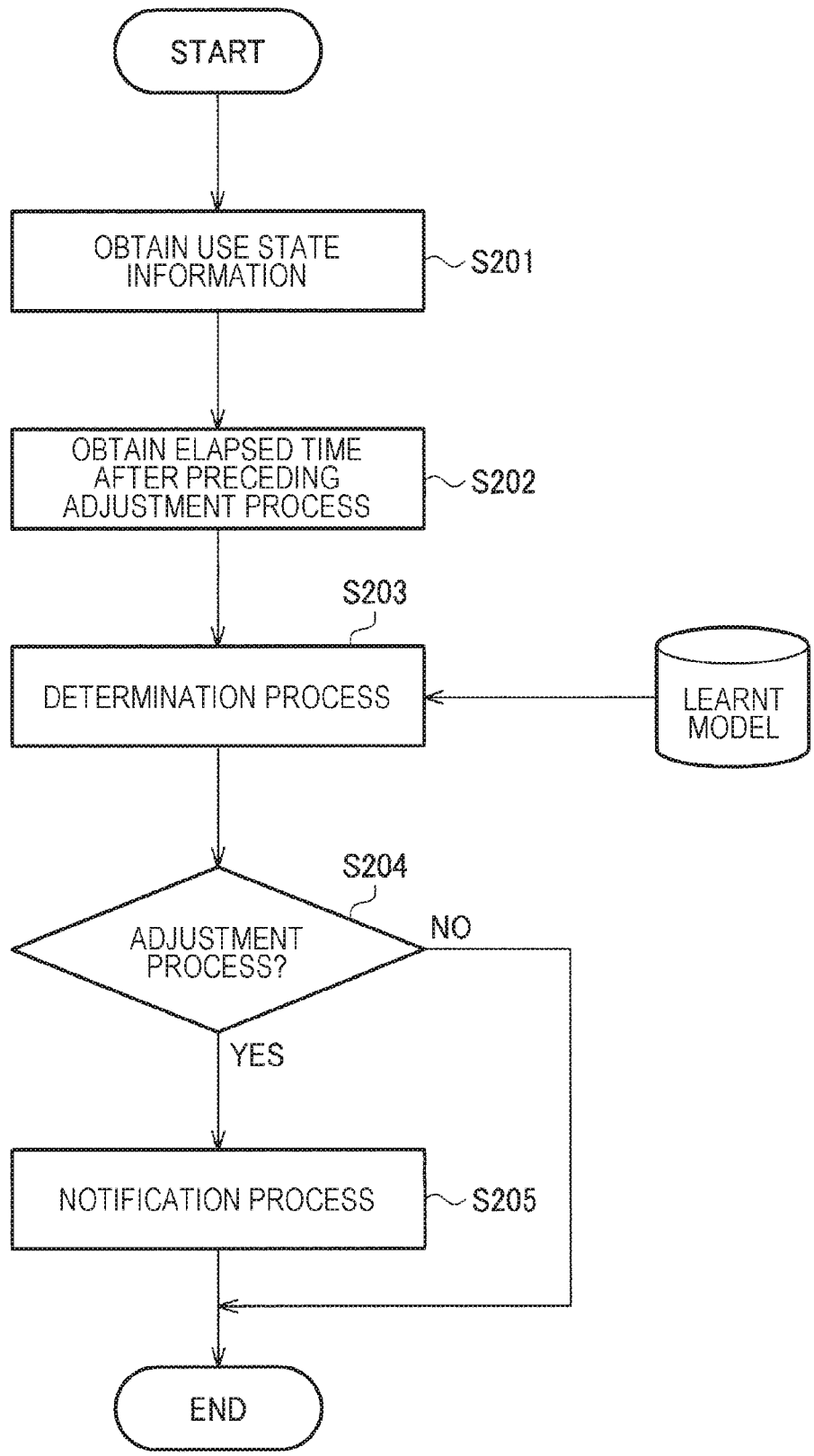
FIG. 16 is a flowchart of another process performed by the information processing apparatus.

Note that the model illustrated in FIG. 12 may be used in this embodiment as described above. FIG. 16 is a flowchart of a process in this case. First, the reception section 210 obtains use state information and elapsed time information of the print apparatus 400 (S201 and S202). The processing section 220 estimates determination result information based on the use state information, the elapsed time information, and a learnt model (S203). Specifically, the process in step S203 is performed to select a largest one of the three probability data corresponding to "early", "appropriate", and "late".

Next, the processing section 220 determines whether the adjustment process is required to be performed (S204). When a determination result corresponds to "appropriate" or "late", the processing section 220 determines that the adjustment process is required to be performed, for example. When it is determined that the adjustment process is required to be performed, the processing section 220 performs the notification process of prompting execution of the adjustment process (S205). Note that the processing section 220 may differentiate content of the notification process between the determination result information indicating "appropriate" and the determination result information indicating "late". When the determination result information indicates "late", print quality may be lowered to the extent that the user may not allow the print quality. Therefore, when the determination result information indicates "late", the processing section 220 executes the notification process of prompting the user to execute the adjustment process more strictly than the determination result information of "appropriate". For example, when the determination result information indicates "late", the processing section 220 may prompt the user to input an appropriate pattern number after performing a process of automatically printing the test pattern illustrated in FIG. 4 or FIG. 6.

When it is determined that the adjustment process is not required (No in S204), the processing section 220 terminates the process without performing the notification process. The negative determination in step S204 specifically corresponds to the determination result information indicating "early".

As described above, the process of estimating an appropriate adjustment interval using a learnt model may be performed for each ink color or for each toner color. For example, the processing section 220 executes the process in FIG. 15 or FIG. 16 for each color.

4. Additional Learning

In this embodiment, a learning step and an estimation step may be clearly distinguished from each other. For example, the learning process is performed by a manufacturer of the print apparatus 400 in advance and the learnt model is stored in the storage section 460 of the print apparatus 400 at the time of shipping of the print apparatus 400. When the print apparatus 400 is used, the stored learnt model is fixedly used.

Note that the method of this embodiment is not limited to this. The learning process of this embodiment may include initial learning for generating an initial learnt model and additional learning for updating the learnt model. The initial learnt model is, for example, a general learnt model stored in the print apparatus 400 in advance before shipping as described above. The additional learning is performed to update the learnt model in accordance with a use state of each user, for example.

For example, the information processing apparatus 200 includes the learning section 120 which updates a learnt model based on use state information obtained at a time of adjustment, adjustment interval information, and a user input when the adjustment process is performed. For example, the adjustment process is executed when the user issues an instruction in response to the notification in step S104 of FIG. 15 or step S205 of FIG. 16. The print apparatus 400 receives a user input indicating whether print quality is normal or abnormal when the adjustment process is performed. In other words, the print apparatus 400 obtains information indicating a result of a determination as to whether an adjustment interval is too long which is made by the user.

When the adjustment interval estimated using the learnt model is too long, the learning section 120 performs the process of updating the learnt model so that the estimated adjustment interval is reduced. The update of the learnt model specifically indicates update of weighting coefficient information.

Furthermore, the print apparatus 400 may receive a user input indicating whether print quality is degraded when normal printing which is different from printing of the test pattern is performed. In this case, the print apparatus 400 performs the adjustment process at a timing when the user input is received. Thereafter, the learning section 120 updates the learnt model so that an adjustment interval which is shorter than the adjustment interval at the timing is output.

By this, the learnt model may be updated in accordance with an actual use state of the print apparatus 400.

The additional learning in this embodiment may be a process of updating the general learnt model used in a plurality of print apparatuses 400 in common. For example, when the learnt model is managed by a server system or the like, the server system performs a process of obtaining information in which the user state information, the adjustment interval information, and the user input are associated with one another from the plurality of print apparatuses 400 and updating the general learnt model based on the obtained information. The updated general learnt model is transmitted from the server system to the individual print apparatuses 400. Note that the additional learning herein is preferably a process of updating a learnt model for each print apparatus 400. Tolerance of the print quality depends on the user. For example, when the user produces products using a commercial printer, it is important to maintain high print quality, and therefore, an allowable amount of shift is small. On the other hand, in a case where the user mainly performs printing of data generated by spreadsheet software, a small shift between print positions is negligible when ruled lines are not considerably shifted, and therefore, an allowable amount of shift is large. When the additional learning is performed using a user input, an adjustment interval to which user's preference is reflected may be estimated.

As described above, the information processing apparatus of this embodiment includes the reception section, the processor, and the storage section. The storage section stores a learnt model obtained by machine learning on a condition for an adjustment interval in accordance with a use state of the print apparatus, based on a data set in which use state information of the print apparatus and adjustment interval information indicating an interval of performing an adjustment process for a print position on a print medium are associated with each other. The reception section receives the use state information of the print apparatus. The processor performs a process of estimating an adjustment interval, based on the use state information received and the learnt model.

According to the method of this embodiment, an appropriate adjustment interval is estimated based on the learnt model obtained as a result of machine learning on the relationship between the use state of the print apparatus and the adjustment interval. Use of machine learning enables estimation of the adjustment interval with high accuracy. Therefore, degradation of print quality and consumption of ink and print media due to the adjustment process may be suppressed.

Furthermore, the use state information may include at least one of temperature information, print frequency information, and aging information.

By this, an appropriate adjustment interval may be estimated in accordance with temperature, print frequency, and elapsed time.

Furthermore, the processor may transmit a notification associated with the adjustment process to a user, based on the adjustment interval estimated.

By this, the user is prompted to execute the adjustment process at an appropriate timing.

Furthermore, the adjustment process may include a process of adjusting a print position in a sub-scanning direction corresponding to the transport direction of print media and a process of adjusting a print position in a main scanning direction which intersects the sub-scanning direction.

By this, a shift between print positions in a desired direction may be appropriately adjusted.

Furthermore, the information processing apparatus may further include an obtaining section which obtains a data set in which use state information and adjustment interval information are associated with each other and a learning section which performs machine learning on a condition for an adjustment interval in accordance with a use state, based on the data set obtained.

In this way, the information processing apparatus may execute the learning process.

Furthermore, when the adjustment process is performed, the learning section may update the learnt model, based on use state information at a time of adjustment, adjustment interval information, and a user input.

By this, an additional learning process may be executed in accordance with a concrete use state. In particular, learning may be performed in accordance of preference of the user, when a user input is used.

Furthermore, the learning apparatus of this embodiment includes an obtaining section which obtains a data set in which use state information of the print apparatus and adjustment interval information indicating an interval of performing an adjustment process for a print position on a print medium are associated with each other and a learning section which performs machine learning on a condition for an adjustment interval in accordance with a use state of the print apparatus based on the data set obtained.

According to the method of this embodiment, machine learning is performed based on a data set in which a use state of the print apparatus and adjustment interval information are associated with each other. By machine learning, an adjustment interval may be estimated with high accuracy taking a use state into consideration.

A learnt model of this embodiment is used to determine an interval of performing the adjustment process for a print position on a print medium in accordance with a use state of the print apparatus. The learnt model includes an input layer, an intermediate layer, and an output layer, and weighting coefficient information including a first weighting coefficient between the input layer and the intermediate layer and a second weighting coefficient between the intermediate layer and the output layer is set based on a data set in which use state information indicating a use state and adjustment interval information indicating an interval of an adjustment process are associated with each other. The learnt model causes a computer to execute a process including: inputting, in the input layer, the use state information received as an input, performing a calculation based on the weighting coefficient information that is set, and outputting information indicating an adjustment interval recommended in the use state indicated by the use state information.

Note that, although this embodiment is described in detail as described above, those skilled in the art may easily understand that various modifications may be made without substantially departing from novelty and effects of this embodiment. Accordingly, such modifications are also included in the scope of the present disclosure. For example, terms which are described at least once along with different terms having a wide meaning or the same meaning in the specification or the drawings may be replaced by the different terms in any portion in the specification and the drawings. Furthermore, all combinations of this embodiment and the modifications are included in the scope of the present disclosure. Furthermore, configurations and operations of the learning apparatus, the information processing apparatus, and the system including the learning apparatus and the information processing apparatus are not limited to those described in this embodiment, and various modifications may be made.

What is claimed is:

1. An information processing apparatus comprising:
a storage section configured to store a learnt model obtained by machine learning on a condition for an adjustment interval in accordance with a use state of a print apparatus, based on a data set in which use state information of the print apparatus is associated with adjustment interval information indicating an interval of performing an adjustment process for a print position on a print medium;
a reception section configured to receive the use state information of the print apparatus; and
a processor configured to perform a process of estimating the adjustment interval, based on the use state information received and the learnt model.

2. The information processing apparatus according to claim 1, wherein
the use state information includes at least one of temperature information, print frequency information, and aging information.

3. The information processing apparatus according to claim 1, wherein
the processor transmits a notification associated with the adjustment process to a user, based on the adjustment interval estimated.

4. The information processing apparatus according to claim 1, wherein
the adjustment process includes at least one of a process of adjusting the print position in a sub-scanning direction corresponding to a transport direction of the print medium and a process of adjusting the print position in a main scanning direction intersecting the sub-scanning direction.

5. The information processing apparatus according to claim 1, further comprising:
an obtaining section configured to obtain the data set in which the use state information is associated with the adjustment interval information; and
a learning section configured to perform machine learning on a condition for the adjustment interval in accordance with the use state, based on the data set obtained.

6. The information processing apparatus according to claim 5, wherein
the learning section updates the learnt model, based on the use state information at a time of adjustment, the adjustment interval information, and a user input.

7. A learning apparatus comprising:
an obtaining section configured to obtain a data set in which use state information of a print apparatus is associated with adjustment interval information indicating an interval of performing an adjustment process for a print position on a print medium; and
a learning section configured to perform machine learning on a condition for an adjustment interval in accordance with a use state of the print apparatus based on the data set obtained.

8. A non-transitory computer-readable storage medium storing a learnt model used to determine an interval of performing an adjustment process for a print position on a print medium in accordance with a use state of a print apparatus,
the learnt model including an input layer, an intermediate layer, and an output layer, in which weighting coefficient information including a first weighting coefficient between the input layer and the intermediate layer and a second weighting coefficient between the intermediate layer and the output layer is set based on a data set where use state information indicating the use state is associated with adjustment interval information indicating an interval of the adjustment process,
the learnt model causing a computer to execute a process comprising:
inputting, to the input layer, the use state information received as an input;
performing a calculation based on the weighting coefficient information that is set; and
outputting, from the output layer, information indicating an adjustment interval recommended in the use state indicated by the use state information.

* * * * *